Aug. 29, 1939.  E. O. NORRIS  2,171,276

METAL HALF TONE SCREEN

Filed Oct. 31, 1936

INVENTOR.
Edward O. Norris

BY Darby & Darby
ATTORNEYS.

Patented Aug. 29, 1939

2,171,276

UNITED STATES PATENT OFFICE 2,171,276

METAL HALF TONE SCREEN

Edward O. Norris, Port Chester, N. Y., assignor to Edward O. Norris, Inc., New York, N. Y., a corporation of New York Application October 31, 1936, Serial No. 108,505

5 Claims. (Cl. 95—81)

This invention is concerned generally with a half tone screen comprising a sheet of perforated metal as distinguished from the ruled glass half tone screen now universally used in the so-called "half tone" process for the production of photographic half tone.

The invention consists in the screen itself in accordance with the following disclosure when taken in connection with the attached drawing from which the objects of the invention will also become apparent.

In the accompanying drawing.

A complete understanding of this invention will be aided by mere reference to the half tone process as now practiced. It is a process whereby an ordinary, continuous or uniform tone picture is converted into a printing surface capable of rendering the various tones or tints of the original picture in a printing press capable of printing only with one density of ink. This has heretofore been accomplished in somewhat the following way: A picture or subject is placed before the lens of a copying camera in front of a white surface such as a copyboard, the relative position between the subject and the camera being readily adjustable. The subject is viewed through the camera and a ground glass and is sharply focused on that glass. A half tone screen of the desired fineness is then inserted in the camera between the lens and the ground glass in proper position and the image is re-focused to accommodate the distortion due to the glass of which such screens are made. Then a sensitized photographic surface properly treated, such as a gelatine-bromide contrast, "dry plate", or a collodion emulsion "wet plate" is substituted for the ground glass in a light tight holder and the screen is then moved up to the proper distance from the sensitized surface by means of a special lever on the outside of the camera. The diaphragm of the lens system is then adjusted to the correct opening, and the lens uncovered to expose the sensitized surface of the subject which is brightly illuminated. At the end of the exposure the sensitized surface is developed, fixed and dried to produce a half tone negative in which the entire tonal graduations are broken up into varied sized opaque and transparent dots.

This negative is then printed onto a sensitized surface formed on a copper, aluminum, zinc or the like plate, or lithographic stone to provide a printing surface. For example, a sheet of copper of the proper gauge is polished on one surface and then coated over heat on a rotator with a solution in the proper and well known proportions of glue, albumen, ammonium bichromate and ammonia in water. When this coating is dry the half tone negative is printed thereon by contact printing and the exposed surface is then developed in water so that the areas which were under transparent dots on the negative having been rendered insoluble, remain and the areas which were under an opaque dot, are washed away. The plate is then set with heat and the print thus obtained is an almost tonal facsimile of the original picture except that where the tone differences were produced by reason of the varied intensities of the pigment the respective tones of the print are obtained by the breaking up of the areas into dots of different sizes and spacing, the dots in the darker areas being large and closely spaced, and the dots in the lighter areas being small and comparatively openly spaced. This effects results from the use of the half tone screen.

Figure 1:
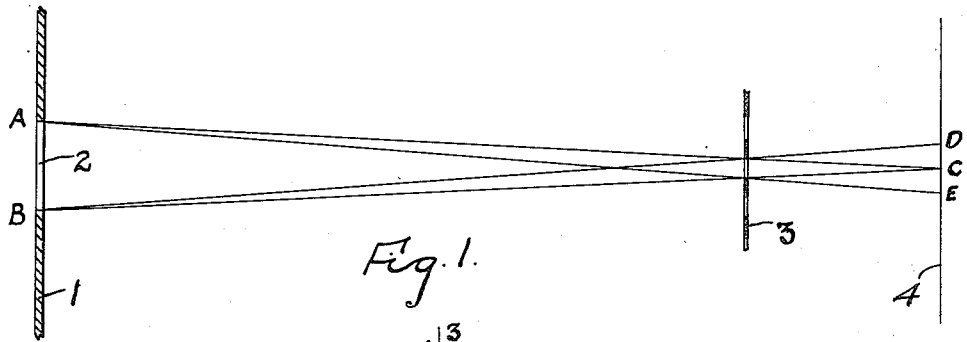
Figure 1 is a diagrammatic view showing the action of the screen of this invention when employed in producing photographic half tones.

This screen which is universally used consists of two flat plates of glass, each plate having alternate opaque and clear straight lines of equal width ruled on one surface. The ruled surfaces of the two plates face each other with the lines extending exactly at right angles and are sealed together with Canada balsam to reduce as much as possible internal reflection. This combination produces a plate made up of small, square, transparent rectangles on an opaque field. The action of such a screen in producing a half tone negative as described above is illustrated in Figure 1. The light passes through the aperture 2 in the diaphragm 1 of the camera and strikes the sensitized surface 4 of the negative after passing through the screen 3. The lines AC, AE, BC and BD represent the outer boundaries of the light rays. The surface 4 is positioned at the intersection C of the lines AC and BC where the light is of maximum intensity. The areas between DC and CE receive light of less intensity in a direction away from the center C. This difference in intensity is very great and in fact is much greater than the sensitivity of the sensitized surface 4 so that a short exposure to light gives for all practical purposes an effect only at C resulting in exposures on the surface in the form of small dots. The longer the exposure the larger the dots become, and a long time, full exposure will increase the size of the dots to a diameter DC. It is apparent that the difference in reflecting power of the various areas in the original picture will have the same effect as a varied time exposure, and, therefore, the difference in the sizes of the dots will be substantially in proportion to the difference in the reflecting power of the corresponding areas of the original picture.

A number of difficulties are present in using a ruled glass half tone screen of the type described above and almost universally employed. For example, the glass of the screen is refractive, interfering with the production of a sharp negative. Such glass screens are subject to "steaming over" in the presence of quick temperature and humidity changes. Glass screens are particularly vulnerable to breakage if mishandled and to surface scratching affecting its light transmitting qualities. A glass screen is relatively heavy being made up of several sheets of glass and this is especially true in the larger sizes. Glass screens do not efficiently transmit the light due in part to internal reflection making a glass screen relatively slow in operation. Finally, it is obvious that such screens are comparatively expensive since the problem of ruling them and cementing them together, so that the sets of light cross exactly at right angles, involves considerable time and care.

The screen of this invention eliminates these difficulties in that it is made up of a very thin sheet of perforated metal which may be treated so that it will have dead black surfaces, and being opaque will not be a source of refraction and will be faster in operation because it is not troubled with internal reflection, and the light does not have to pass through the opaque portions thereof. In other words, no part of the material of the screen transmits light as all the light that is transmitted passes through the apertures in the screen which are open spaces. Such a screen is not subject to damage by scratching, is light in weight and is easily handled and is not subject to breakage if dropped. Likewise, since the material of the screen does not transmit light, it is not bothered by a collection of moisture on its surfaces. Furthermore, such a screen is much thinner than a glass screen.

Heretofore, such a screen has not been used because it has not been available. A method of producing such a screen will now be described for the purpose of making this disclosure complete within itself, although a number of methods for producing it are disclosed in my copending applications, Serial No. 756,224, filed December 6, 1934 and Serial No. 52,334, filed November 30, 1935.

Figure 2:
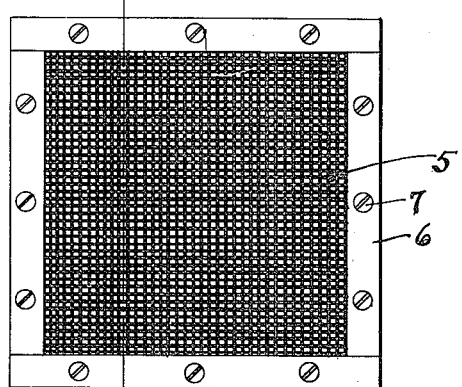
Fig. 2 is a side elevational view of the screen of this invention.
Figure 3:
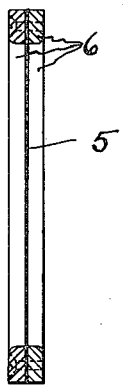
Fig. 3 is a cross sectional view on the line 3—3 of Fig. 2.

For example, this screen may be made by shellacking one side of a sheet of copper or brass about 0.002 to 0.005 inch in thickness. While the shellac is still wet, the sheet of metal which of course is of the desired size is stuck to a sheet of glass. The exposed face of the sheet is then thoroughly cleaned and coated in a rotator with any one of a number of well known and suitable light, sensitive, shellac solutions, one of which is known in commerce as "Cold Top". The coated sheet is then exposed to a strong light in contact with a photographic negative of a half tone screen. This negative may be made by a procedure similar to that described above in which a photographic light sensitive plate is exposed to a highly illuminated flat white surface through a glass half tone screen. This negative is then developed and fixed and consists of a plurality of fine opaque dots on the transparent field. The exposed glass-metal plate is then developed in a suitable developing solution, such as alcohol developing solution where the soluble unexposed areas are washed away, exposing the metal of the plate at these areas. The glass-metal sheet is then immersed in a ferric chloride solution until the exposed areas are etched through the metal. It may be noted that the concentration of the chloride solution is not critical. The metal glass is then removed and cleaned in a warm sodium cyanide solution. The concentration of this solution is likewise not critical. The cleaned sheet is then blackened all over either by immersing in a potassium sulphide solution or by electroplating thereon a deposit of black nickel. The sheet then has the appearance as indicated at 5 in Figure 2. It comprises a thin perforated sheet of metal in which the perforations are square and the areas between the perforations are solid, and likewise square and of area equal to the area of the perforations. This sheet is then mounted in a rigid metal frame comprising pairs of members 6 which clasp the sheet at its edges by reason of the uniting of the framing strips with screws 7. The screen is preferably stretched and held under tension while it is being clamped in the frame so that it will form a flat plane surface. The frame members are of course of sufficient size and rigidity to hold the screen under tension and perfectly flat.

The following is a preferred method of producing the screen:

A flat sheet of copper is cleaned and coated on one side with a suitable sensitized solution in a rotator. When dried the coated side is exposed to a strong light in contact with a half tone negative. Preferably it is exposed through a glass screen which has a series of parallel lines ruled on it in one direction only. At the end of this exposure the glass plate is rotated through an angle of 90 degrees so that the ruled lines extend at right angles to their original position, and the sensitized plate is again exposed, developed and fixed, which fixing consists in heating the plate to harden the remaining portions of the coating, the other portions having been removed by developing which consists in washing the plate out in water. The plate then has on its surface a plurality of rectangularly arranged and spaced small square exposed areas of metal in a field formed by the remaining portions of the coating which of course overlie and protect the metal directly thereunder. The plate is then etched in ferric chloride until it is pitted or depressions are formed at the square exposed areas of the metal plate. The remainder of the coating is then removed with a warm cyanide solution and the depressions are filled with an acid resist of which there are a number of well known and suitable compounds on the market. The plate is then rubbed down until the metal between the depressions is exposed and cleaned. The exposed face of the plate is then given a thin nickel plating which plating is then coated with a thin film of wax. The complete sheet or plate is then immersed in a copper electroplating solution and copper is deposited thereon until a screen of the desired thickness and strength is formed. If desired this last plated layer may consist of alternate thin layers of nickel and copper produced by alternate electro-plating action in suitable solutions. Such a laminated sheet gives greater strength and smoothness in the finished article. The sheet is then stripped from the plate and blackened as before, and finally stripped and mounted in a frame as described above.

Both of these methods of producing a screen are described in detail in my applications mentioned above and are not claimed here.

I do not desire that I be limited by the disclosure given above for purposes of illustration but rather to the appended claims.

What I seek to secure by United States Letters Patent is:

1. A half-tone screen comprising a thin perforated sheet of metal mounted in a rigid frame under tension, the surface of said sheet being substantially non-reflective to light.

2. A half-tone screen comprising a thin perforated sheet of metal mounted in a rigid frame under tension, the surface of said sheet including the walls of the perforations being non-reflective to light.

3. A half-tone screen comprising a thin perforated sheet of metal mounted in a rigid frame under tension, the surface of said sheet including the walls of the perforations being black and non-reflective to light.

4. A half-tone screen comprising a thin perforated sheet of metal mounted in a rigid frame under tension, the plane of the sheet being midway between the planes of the outer surfaces of the frame.

5. A half-tone screen comprising a thin perforated sheet of metal mounted in a rigid frame under tension, the plane of the sheet being midway between the planes of the outer surfaces of the frame and the sheet itself being black and non-reflective to light.

EDWARD O. NORRIS.